(12) United States Patent
Blank (10) Patent No.: US 11,512,238 B2
(45) Date of Patent: Nov. 29, 2022

(54) INFUSED SALT AND MANUFACTURING METHODS

(71) Applicant: Andrew Blank, Hudson, MA (US)

(72) Inventor: Andrew Blank, Hudson, MA (US)

( * ) Notice: Subject to any disclaimer, the term of this patent is extended or adjusted under 35 U.S.C. 154(b) by 0 days.

(21) Appl. No.: 16/261,817

(22) Filed: Jan. 30, 2019

(65) Prior Publication Data

US 2020/0239753 A1    Jul. 30, 2020

(51) Int. Cl.
| | |
|---|---|
| *C09K 3/18* | (2006.01) |
| *A23L 5/42* | (2016.01) |
| *A23P 20/12* | (2016.01) |
| *A23L 3/34* | (2006.01) |
| *A23L 27/40* | (2016.01) |

(52) U.S. Cl.
CPC ............... *C09K 3/185* (2013.01); *A23L 3/34* (2013.01); *A23L 5/42* (2016.08); *A23L 27/40* (2016.08); *A23P 20/12* (2016.08); *A23V 2002/00* (2013.01)

(58) Field of Classification Search
CPC .... A23L 27/40; A23L 5/42; A23L 3/34; A23P 20/12; A23V 2002/00; C09K 3/185; C09K 5/066; C01D 3/22; C01P 2004/01; C01P 2006/82; C01P 2004/60; C01P 2006/20
USPC ........................................................ 426/250
See application file for complete search history.

(56) References Cited

U.S. PATENT DOCUMENTS

| | | | |
|---|---|---|---|
| 2,410,910 | A | 11/1946 | Wait |
| 3,433,863 | A | 3/1969 | Bowden et al. |
| 4,048,288 | A * | 9/1977 | Sinke ..................... C01D 3/26 |
| | | | 423/267 |
| 4,243,415 | A | 1/1981 | Lowe, Jr. |
| 4,512,907 | A | 4/1985 | McConnell |
| 4,960,531 | A | 10/1990 | Connor et al. |
| 5,531,931 | A | 7/1996 | Koefod |
| 5,683,619 | A | 11/1997 | Ossian et al. |
| 6,039,890 | A | 3/2000 | Ossian et al. |
| 2006/0054720 | A1 | 3/2006 | Valiton et al. |
| 2007/0221749 | A1 | 9/2007 | Zaharis |
| 2008/0054218 | A1 | 3/2008 | Koefod |
| 2014/0065288 | A1 | 3/2014 | Brown et al. |
| 2015/0344759 | A1 | 12/2015 | Matuszczak et al. |
| 2018/0230350 | A1* | 8/2018 | Neal ..................... C09K 3/185 |

FOREIGN PATENT DOCUMENTS

| | | |
|---|---|---|
| CN | 2471821 Y | 1/2002 |
| WO | 1999013018 A1 | 3/1999 |
| WO | 2003042323 A1 | 5/2003 |

OTHER PUBLICATIONS

Angus Chemical Company. AMP-95® 2-Amino-2-methyl-1-propanol Safety Data Sheet. Nov. 2, 2017.
Chromatech Incorporated. D969029 Chromatint Green 3542 Liquid Safety Data Sheet. Aug. 26, 2016.
Huck Salt. Sierra Melt Ice Melt. Url: <http://www.hucksalt.com/sierramelt.html>.

* cited by examiner

*Primary Examiner* — Subbalakshmi Prakash
(74) *Attorney, Agent, or Firm* — Nutter McClennen & Fish LLP (57) ABSTRACT

A method of infusing salt can include heating salt to a temperature above the boiling point of water. The method can also apply a liquid additive solution to the heated salt to create an infused salt. The temperature of the heated salt can be sufficiently high that the salt remains above the boiling point of water for a first period of time after the liquid additive solution is applied thereto.

14 Claims, 6 Drawing Sheets

INFUSED SALT AND MANUFACTURING METHODS

FIELD

The present disclosure generally relates to infused salt and methods for manufacturing the same. More particularly, the present disclosure related to improved infused salt products, such as ice melt compositions, edible infused salts, etc., and methods for manufacturing the same.

BACKGROUND

In cold climates, the formation of ice on surfaces such as roadways and sidewalks can present a significant hazard to motorists and pedestrians. Frequently, various ice melt compositions are applied to such surfaces to melt ice formed thereon and prevent falling snow or rain from freezing.

There are a variety of different types of ice melt available and the term can refer to any of a variety of products designed to help melt ice and/or hinder the formation of ice on surfaces. One type of ice melt is rock salt, otherwise known as halite or coarse salt, which is bulk salt mined from the ground and typically crushed as mined into a plurality of coarse salt crystals. Another salt used as ice melt is solar salt, which can be formed by evaporating water out of a brine solution to leave behind only salt. The brine solution can in some cases be seawater or a brine solution created by pumping freshwater into, e.g., a salt cave in the earth and subsequently extracting the water and salt mixture.

Using a natural salt as an ice melt composition is based on the phenomenon of freezing point depression, wherein the freezing point of a brine solution is lower than the freezing point of pure water. Pure salt as an ice melt has limited effectiveness, however, because the freezing point depresses only a few degrees. Accordingly, salt is only effective as an ice melt down to about −4° C.

To achieve better performance at lower temperatures, ice melt compositions can include a number of additives, including any of a variety of chemical deicers, dyes, corrosion inhibitors, etc. Common examples of deicing additives include calcium chloride (which can help melt down to −52° C.), potassium chloride (which can help melt down to −12° C.), magnesium chloride (which can help melt down to −7° C.), and calcium magnesium acetate, among others.

Ice melt compositions that include such additives are typically manufactured in a couple different manners: In some cases, additive pellets are dry blended with rock salt or another natural salt base to create a blended final product. This is typically a lower cost manufacturing method that creates a product with drawbacks. For example, dry blending pellets of a deicing chemical with rock salt can produce a product that melts inconsistently and creates a patchwork of melted areas (e.g., the dicing additive pellets will melt—and exhaust themselves—much more quickly than the salt).

In other cases, rock salt crystals can be coated with a deicing additive, such as calcium chloride. The resulting product can also have significant drawbacks, however. For example, such ice melt compositions can provide rapid initial melting that lasts for only a relatively short time until the exterior coating of deicing additive is exhausted. This initial melt is then followed by much poorer melt performance when only the underlying salt remains. These products can also create problems with corrosion because any corrosion inhibitors in the additive coating are similarly dissolved away rapidly to leave just the corrosive salt byproduct on the surface.

Still another ice melt composition is one created entirely from a chemical deicing agent, such as calcium chloride, without using any natural salt. While such ice melts can be effective, they are also much more expensive than natural salt-based compositions. In addition, certain deicing additives, such as calcium chloride, create an exothermic reaction with water that, while effective to help melting, can be uncomfortable or harmful to pets that walk directly on treated surfaces (this can occur with the above-described exterior-coated ice melt products as well as pure chemical deicing ice melt compositions). Moreover, generally speaking many single chemical deicers can be undesirable in the environment, so ice melt compositions made entirely from such components can be harmful or undesirable.

Accordingly, known ice melt compositions have a number of drawbacks, including poor melt performance if composed of purely salt or a dry blended or exterior-coated salt mix, expense if purely or primarily chemical deicers, and possible harms to pets based on exothermic reactions from certain chemical deicers. As a result, there remains a need for improved ice melt compositions and methods for manufacturing the same that provide improved melt performance, reduced cost, and fewer drawbacks compared to prior ice melt compositions.

SUMMARY

The present disclosure is directed to various embodiments of infused salt products and methods for manufacturing the same. The disclosed embodiments can be particularly effective for creating ice melt compositions that address the various issues noted above, but can also have utility in the creation of infused salt products for other uses, such as edible infused salts, etc. In brief, embodiments of the present disclosure are directed to infused salt compositions wherein a natural salt base is infused with one or more additives such that the additives are found throughout each salt crystal and not merely coated over an exterior thereof. In the embodiments related to ice melt compositions, the disclosed embodiments can enable any infused ice melt additives to be effective throughout the half-life of the product and not simply exhausted quickly to leave behind a poorer performing natural salt crystal that has the associated drawbacks of using pure salt (e.g., corrosion, etc.).

Further, certain embodiments of the methods described in the present disclosure can include heating a natural salt base, such as rock salt or edible salt, above the boiling temperature of water prior to applying any additives. Heating the salt in this manner can remove any water from each salt crystal, leaving behind voids throughout the crystal that once contained water. Following heating to remove moisture, a liquid additive solution can be applied to the salt while it remains above the boiling temperature of water. At this elevated temperature, the liquid solution can more readily permeate through the voids in each salt crystal and the water of the solution can be flash evaporated/boiled away to leave solely the additives dispersed throughout the voids of each salt crystal as well as coated over an exterior surface thereof.

One advantage of the disclosed embodiments compared to prior techniques for infusing salt and/or creating ice melt compositions is that increased quantities of water can be utilized to enable spray application of a variety of additives that are not possible with conventional manufacturing methods that do not heat the salt enough to allow for the vaporization of any added water in a liquid solution sprayed thereon. Indeed, many prior techniques spray additives and follow such application with a drying step, rather than first elevating the temperature of the salt above a boiling temperature of water sufficiently to allow a liquid additive solution to be sprayed thereon and any water in the solution to be vaporized by the heated salt.

In accordance with one embodiment, a method of infusing salt can include heating salt to a temperature above the boiling point of water. The method can also include applying a liquid additive solution to the heated salt to create an infused salt. The temperature of the heated salt can be sufficiently high that the salt remains above the boiling point of water for a first period of time after the liquid additive solution is applied thereto.

The temperature above the boiling point of water can be at least about 110° C. In some embodiments, the temperature above the boiling point of water can be at least about 148° C. In further embodiments, the temperature above the boiling point of water can be below about 250° C. In some embodiments, the method can include bagging the infused salt while it is at a temperature between about 54° C. and about 88° C.

The salt can be heated to the temperature above the boiling point of water within a second period of time in some embodiments. The second period of time can be between about 1 minute to about 2 minutes in some embodiments. The first period of time can be less than about 1 minute in some embodiments.

In some embodiments, the salt can be natural rock salt. Among other things, the liquid additive solution can include any of dyes, corrosion inhibitors, and/or chemical deicers. Additionally, or alternatively, the liquid additive solution can include edible additives. In some embodiments the liquid additive solution can comprise at least one of calcium chloride, magnesium chloride, potassium chloride, calcium magnesium acetate, potassium acetate, potassium formate, sodium formate, calcium formate, urea, methanol, ethylene glycol, propylene glycol, or glycerol. In some embodiments, a second dry additive can be applied to an outer surface of the infused salt.

In some embodiments, the liquid additive solution can be applied immediately after the salt is heated to the temperature above the boiling point of water. Furthermore, heating the salt to the temperature above the boiling point of water can vaporize water in the salt. In some embodiments, the salt can be heated to bring down the moisture content therein to less than 1%.

The present invention further provides devices and methods as claimed. Any of the features or variations described above can be applied to any particular aspect or embodiment of the disclosure in a number of different combinations. The absence of explicit recitation of any particular combination is due solely to the avoidance of repetition in this summary.

DETAILED DESCRIPTION

Certain exemplary embodiments will now be described to provide an overall understanding of the principles of the structure, function, manufacture, and use of the compositions and methods disclosed herein. One or more examples of these embodiments are illustrated in the accompanying drawings. Those skilled in the art will understand that the compositions and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present disclosure.

Additionally, to the extent that linear or circular dimensions are used in the description of the disclosed compositions and methods, such dimensions are not intended to limit the types of shapes that can be used in conjunction with such compositions and methods. A person skilled in the art will recognize that an equivalent to such linear and circular dimensions can easily be determined for any geometric shape. Further, in the present disclosure, like-numbered components of the embodiments generally have similar features.

In illustrative embodiments, an infused salt product, such as an ice melt composition, is formed from a rock salt or edible salt (or other natural salt) base infused with one or more additives (e.g., a deicing agent, a corrosion inhibitor, a dye, etc. in the case of ice melt compositions). With reference to ice melt compositions, the infused additives can react for a longer time than prior deicing agent coated compositions where the coating is formed only over an exterior or outermost/outwardly facing surface. To infuse the deicing agent in the rock salt, the rock salt can be heated to greater than the boiling temperature of water (e.g., 100° C.) prior to applying the deicing agent or other additive. Further, the rock salt can be heated to a high enough temperature that it will remain above the boiling temperature of water even after application of any liquid additive solution thereto (e.g., above about 110° C.). This heating process can cause moisture trapped in each salt crystal to vaporize rapidly, leaving behind a void within the crystal, oftentimes also opening a crack or crevice from the void to a surface of the crystal. Subsequent exposure of the salt crystal to a solution containing the deicing agent and/or other additives can deposit the additives within these voids and crevices, substantially infusing an entirety of the salt crystal with additives. This can create a long lasting higher performance ice melt composition wherein additive is available to react with ice and water throughout the dissolution of the salt crystal, rather than being exhausted quickly upon first application, as in the case of solely an exterior coating. Details of illustrative embodiments are discussed below.

Figure 1:
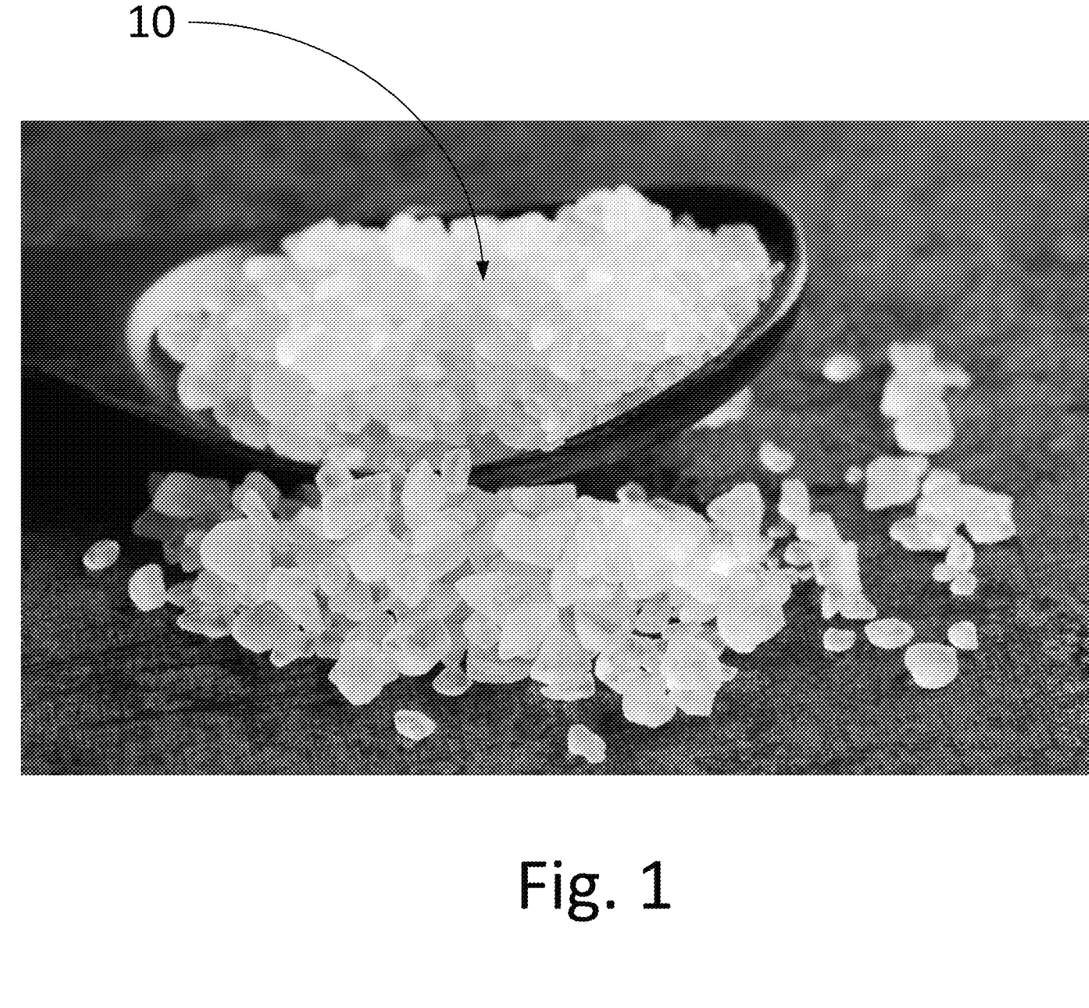
FIG. 1 schematically shows rock salt in accordance with illustrative embodiments of the invention.

FIG. 1 schematically shows a salt base 10 in accordance with illustrative embodiments of the invention. The salt base 10 can be, for example, natural rock salt. For discussion purposes, illustrative embodiments refer to rock salt 10, but it should be understood that any natural salt base may be used instead of, or in addition to, the rock salt 10. As shown, the rock salt 10 is in crystal form. Each rock salt 10 crystal is a naturally occurring form of salt, though it may undergo some processing during extraction (e.g., salts are typically crushed to size specification as mined or extracted). This is in comparison, however, to other more processed forms of salt (e.g., salts that are processed into other forms, such as pelletizing, etc., have binders added, etc.).

The rock salt 10, also known as halite, can help manage ice formation on surfaces (e.g., roads, walkways, etc.) by combining with water to form a brine solution with a freezing point lower than water alone. Because brine, which is a solution of water and salt 10, has a lower freezing point than pure water, placing salt 10 or saltwater on ice that is near 0° C. can assist with melting of ice and hinder the formation of additional ice.

To further assist melting of ice, some rock salt 10 compositions are blended or coated with a chemical deicing agent that produces an exothermic reaction with water.

The deicing agent may include, for example, magnesium chloride and/or calcium chloride, among others. As discussed above, however, merely coating an exterior or outward facing surface of a salt crystal, or dry blending pellets of deicing agent with salt crystals, can create an ice melt with inferior performance. In the case of coated salt crystals, for example, the layer of deicing agent on the outward-facing surface of the crystal can react—and be exhausted—quickly following application to a surface. This can quickly leave behind, for example, pure salt without corrosion inhibitors, which can create a hazard, nuisance, or potential damage to property, plant life, etc. since salt itself without any counteracting additives is corrosive. This is because the deicing agent forms an outer layer on the surface of the rock salt 10 that is exposed directly to, and reacts with, moisture in the environment and/or in the rock salt 10. Accordingly, to provide a longer lasting ice melt, illustrative embodiments infuse deicing agent or other additives throughout the rock salt 10 within voids in each salt crystal formed by boiling off water trapped therein. Furthermore, illustrative embodiments create such voids by removing moisture from within each rock salt crystal by heating the salt to above the boiling temperature of water over a short period of time prior to applying any additives. This is in contrast to many prior manufacturing procedures that heat salt-based ice melt compositions to less than a boiling temperature of water and/or apply such heating only after applying additives to the salt crystals.

Figure 2:
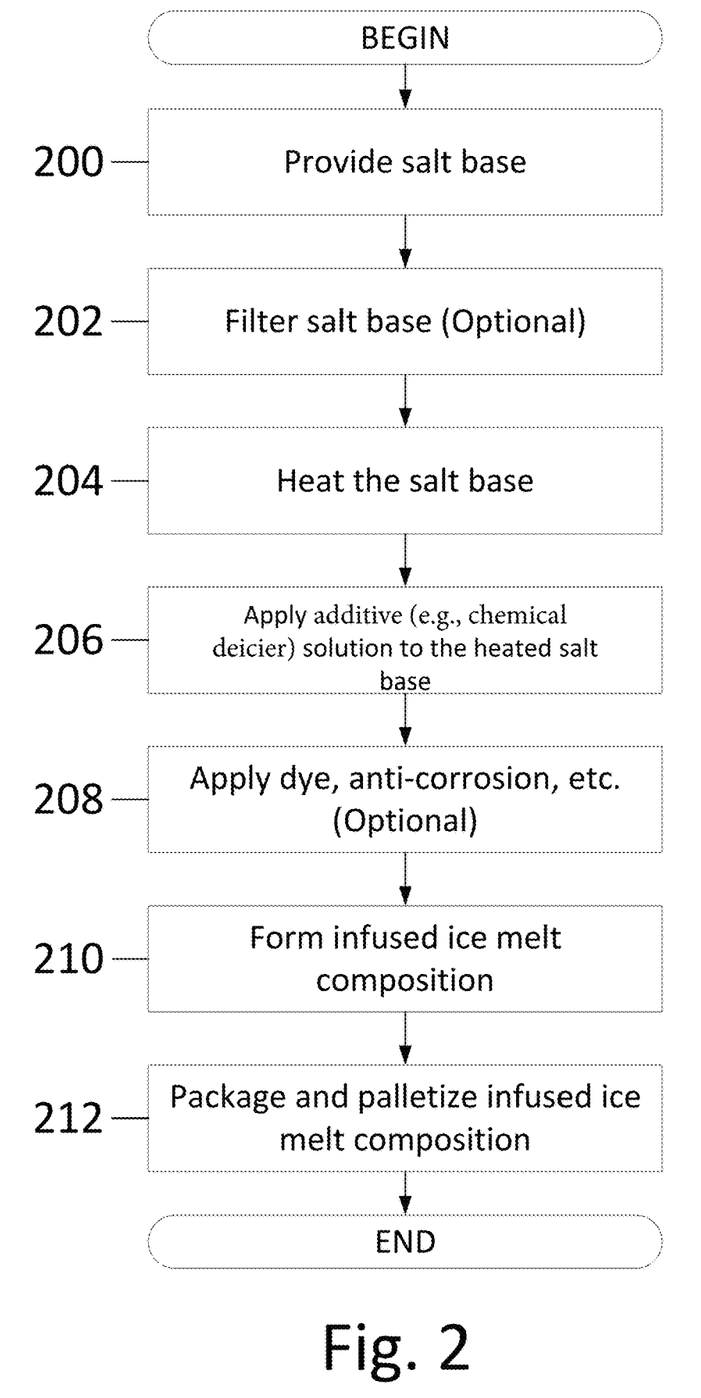
FIG. 2 shows a process of forming an infused ice melt composition in accordance with illustrative embodiments of the invention.

FIG. 2 shows one embodiment of a process of forming an infused ice melt composition in accordance with illustrative embodiments of the invention. It should be noted that this process can be a simplified version of a more complex process of producing the infused ice melt composition. As such, the process may have additional steps that are not discussed. In addition, some steps may be optional, performed in a different order, or in parallel with each other. Accordingly, discussion of this process is illustrative and not intended to limit various embodiments of the invention. Finally, although this process is discussed with regard to producing a single infused rock salt 10 crystal, the process of FIG. 2 can be expanded to cover processes for producing a plurality of rock salt 10 crystals at the same time.

Figure 3:
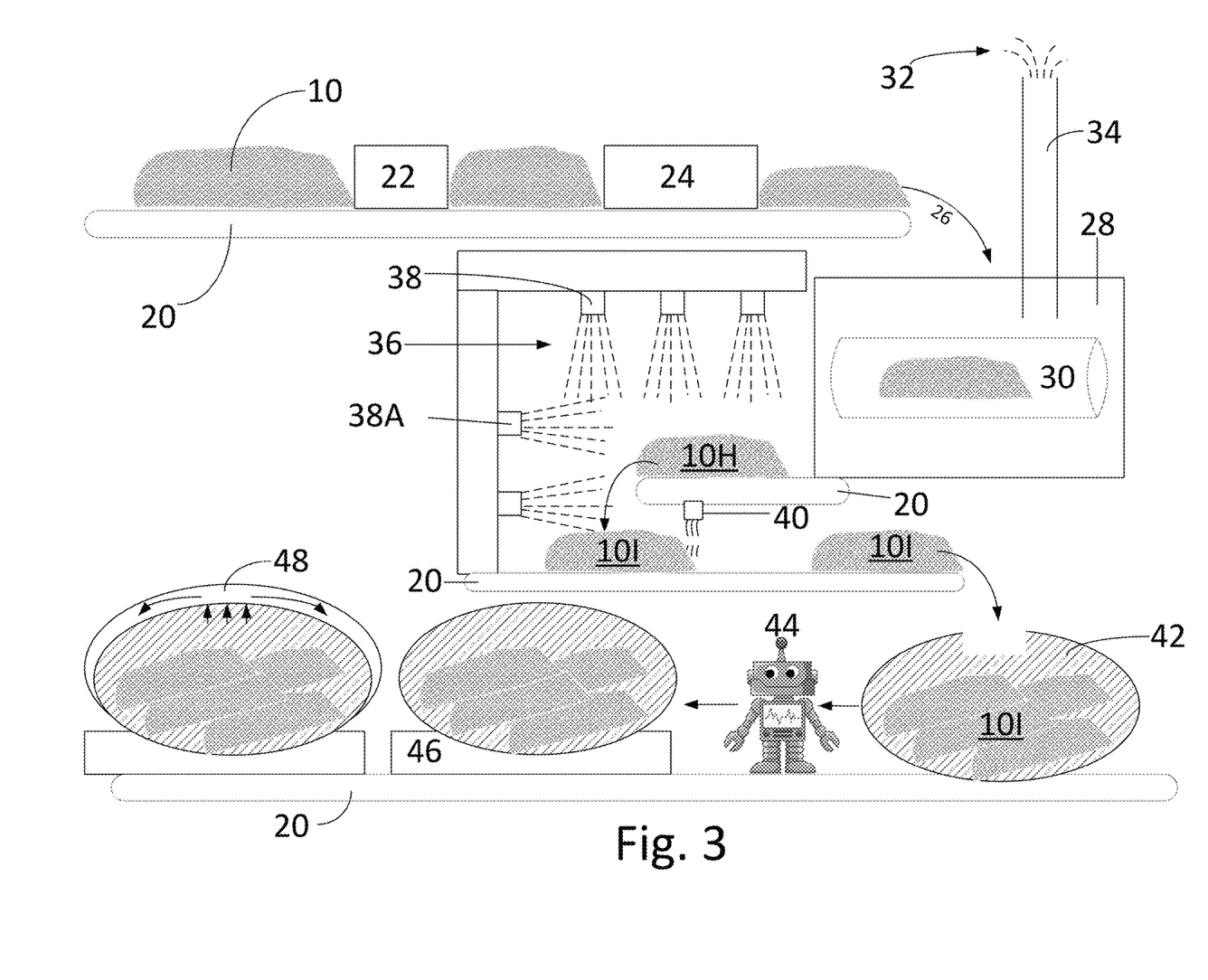
FIG. 3 schematically shows an example of the process described in FIG. 2 in accordance with illustrative embodiments of the invention.

FIG. 3 schematically shows an example of the process described in FIG. 2 in accordance with illustrative embodiments of the invention. The process begins at step 200, which provides the salt base 10, such as the compilation of rock salt 10 shown in FIG. 3. To that end, large quantities (e.g., 50 lbs. and greater) of the rock salt 10 may be lifted and deposited onto a conveyor 20 using a forklift (not shown) to begin the process. In some embodiments, a front-end loader can be used to deposit large quantities of bulk rock salt taken from, for example, a large pile of rock salt. Although this discussion refers to the rock salt 10, it should be understood that illustrative embodiments may use other forms of salt or sodium chloride. As noted above, the rock salt 10 can be provided in individual crystal form and not in pelletized or otherwise processed forms.

The next step 202 in the process optionally filters the rock salt 10 to remove "overs" and "unders," pieces that are either oversized or undersized, respectively, to provide a base of salt crystals that are of a "middle" size. Such crystals are typically between about 3 mm and about 7 mm in diameter or along a major axis thereof. The midsized rock salt 10 can be preferable because it can flow more efficiently through a spreader mechanism, e.g., for application to a road surface, without causing clogs, jams, etc. To accomplish this filtering, the rock salt 10 may run, for example, through a two-step filter that removes both smaller particles (e.g., less than 3 mm) and larger particles (e.g., greater than 7 mm), leaving behind the above-noted midsized rock salt 10 crystals. As shown in FIG. 3, a large-particle filter 22 and a small-particle filter 24 may filter the rock salt 10. In some embodiments, the filters 22 and 24 can be integrated into a single device. It should be further noted that the embodiments described herein are able to accommodate a greater range of variability in crystal size than prior ice melt compositions due to a lower level of water absorption from the environment, as explained below. Accordingly, the midsized rock salt crystals between about 3 mm and about 7 mm in diameter include greater variation than is typically seen in ice melt compositions. This can provide an advantage in that the ice melt composition according to the present disclosure can include a variety of both smaller and larger crystals, even within a particular category of all crystals being midsized. This can result in improved ice melt performance, as smaller crystals can dissolve more quickly to provide rapid ice melting, while larger crystals can last longer and provide a greater effective length or half-life of the product, perhaps stretching across days and between storms, for example.

Step 204 shown in FIG. 2 heats the rock salt 10. A conveyor 20 (e.g., a screw conveyor, belt conveyer, etc.) may convey the filtered rock salt 10 and deposit 26 the salt 10 into a cooker 28. Natural rock salt 10 is typically between about 3% and about 10% water by weight. Heating the rock salt 10 at a temperature above the boiling point of water can remove moisture from within the rock salt 10 crystals. Removal of moisture in this manner can furthermore create voids within the salt crystals where water once was. Still further, the vaporization of water within the salt crystal and the subsequent escape of the vapor from the crystal can create a plurality of cracks and crevices throughout the crystal leading from interior voids to a surface of the crystal. This network of voids and cracks/crevices leading from a surface of the crystal to each void form the basis of a network that can be used to infuse additives throughout the crystal in subsequent steps described in more detail below.

The above-described heating process can include heating the salt to above the boiling temperature of water rapidly. In some embodiments, this can mean heating the salt to above 100° C. In some embodiments, a higher temperature can be utilized to achieve better performance and/or complete heating in less time. In some embodiments, for example, the salt can be heated to between about 101° C. and about 260° C. In some embodiments, the salt can be heated to between about 101° C. and about 191° C. In some embodiments, the salt can be heated above about 110° C. In some embodiments, the salt can be heated to between about 148° C. and about 160° C. Heating can be accomplished in a number of manners. For example, in some embodiments the rock salt 10 can be dried using a flame cooker 28 that rapidly increases the temperature in a chamber 30 of the cooker 28 from ambient to between about 148° C. and about 160° C. in about 1 minute. In some embodiments, the cooker 28 can include a 4.5 million BTU jet turbine flame that heats the salt within the chamber 30 from ambient to between about 148° C. and about 160° C. in about 55 seconds. In some embodiments, of course, the heating temperature can be changed such that the salt in the chamber 30 reaches a temperature above 100° C. or, in some embodiments, above about 110° C. or, in some embodiments, above 148° C., in about two minutes, about five minutes, or another desired time. Additionally, some embodiments may include a screw conveyor in the chamber 30 that rotates the rock salt 10 during heating. Additionally, or alternatively, the chamber 30 itself may rotate to ensure even heating of each salt crystal. In still other embodiments, a fluid bed heater can be utilized instead of a flame cooker. A fluid bed heater, by way of example, spreads the salt over a perforated surface and blows hot air up through the perforated surface from below.

Without wishing to be bound by any particular theory, the inventors hypothesize that heating the rock salt 10 particles at the temperatures described herein vaporizes the moisture and/or water within the salt crystals. The vaporization of water disposed within each crystal leaves behind a void within the crystal. Further, the escape of vaporized water from within the crystal can create a series of cracks or crevices through the crystal from an interior void to an exterior surface. These cracks, crevices, and voids can be created and/or enlarged by the conversion of liquid water to vapor (which can, e.g., be accompanied by a pressure increase that may fracture the salt crystal to create cracks and crevices). Escaping water vapor, e.g., steam 32, produced during heating of the rock salt 10 can be collected and removed using a dust collector 34 or other venting apparatus. To this end, it can be desirable to heat the salt to a temperature above the boiling point of water rapidly, as the rapid heating of the water content of the salt can create a greater amount of crevices or cracks in the crystal as the water rapidly heats and vaporizes without sufficient time to slowly dissipate vapor pressure through existing smaller fissures or openings in the crystal. In some embodiments, as noted above, it can be desirable to heat the salt above a boiling point of water within about 1 minute to about 2 minutes, or to heat the salt to such a temperature more rapidly and maintain such temperature for at least about 1 minute to about 2 minutes. For example, in some embodiments, the salt can be heated for about 90 seconds to bring its temperature sufficiently high enough above the boiling temperature of water that a liquid additive solution can be applied without bringing the temperature of the salt below the boiling point of water, as described in more detail below.

After the rock salt 10 is heated, the process moves immediately to step 206, in which one or more additives, e.g., including a chemical deicing agent, are applied to the heated salt base 10H via spraying of a liquid solution 36 (shown in FIG. 3). In illustrative embodiments, the deicing solution 36 is applied to the heated salt base 10H immediately as it exits the cooker 28. However, in some embodiments, the deicing solution 36 may be applied to the heated salt base 10H within one second, two seconds, five seconds, ten seconds, twenty seconds, thirty seconds, forty seconds, one minute, two minutes, or five minutes of (a) the cessation of heat, or (b) the heated salt base 10H exiting the cooker 28.

Although FIG. 3 shows sprayers 38 applying liquid additive solution 36 as the heated salt base 10H moves on the conveyor 20, this is just a schematic representation. In some embodiments, the additive solution 36 can be applied to the heated salt base 10H as it remains in the cooker 28 (e.g., using sprayers 38 integrated with the cooker 28). Additionally, or alternatively, the heated salt base 10H may fall from the cooker 28 directly into a storage container 40 or storage area without the use of a conveyor 20. In some embodiments, the additive solution 36 can be applied to the heated salt base 10 as it falls. Furthermore, in some embodiments, the additive solution 36 can be applied to the heated salt base 10H while the cooker 28 is still on or cooling down.

The liquid additive solution 36 can include, among other things, a chemical deicing agent such as calcium chloride and/or magnesium chloride. In some embodiments, the liquid solution can be formed from a water base. For example, in some embodiments a water-based liquid solution can be used to ensure proper viscosity of the solution for spraying onto the heated salt. In some embodiments, between about 2 and about 6 gallons of water per ton of additive material can be used to form the liquid additive solution. Using a liquid solution can facilitate spraying onto the salt base and can help carry the additive materials throughout the salt crystal via the various cracks/crevices formed therein such that additive material ends up coating an exterior surface of each crystal as well as disposed within each crack, crevice, and void within each crystal.

While water is useful to facilitate the dispersal of additive material throughout each salt crystal, it is not desirable to increase the water content of the salt given that the product has been heated to remove water content. This is because increased water content in salt can cause the crystals to clump together, thereby preventing their ability to flow through a spreader, etc.

The addition of water to the salt during spraying of the additive solution is avoided, however, by applying the additive solution to the salt while it remains heated, e.g., to above the boiling temperature of water. Furthermore, the heated salt should be sufficiently above the boiling temperature of water that application of the liquid additive solution does not reduce the temperature of the heated salt below the boiling temperature of water. With the salt at such an elevated temperature, water in the liquid additive solution is itself vaporized via flash evaporation or boiling as the additive solution 36 is applied to the heated salt base 10H. This leaves behind solely the additives (e.g., the deicing agent) as residue in the voids, cracks, and crevices of each salt crystal and on the surface of each rock salt 10 crystal. Accordingly, additional water does not get trapped within the crevices or voids of the rock salt 10 crystal, but functions as a medium through which deicing agent or other additives are delivered into the crevices. The end result is a salt crystal infused throughout with additives, such as chemical deicing agents, corrosion inhibitors, dyes, etc., and not merely coated over an exterior-facing surface with such additives. Such a product can continue to provide enhanced ice melt performance, along with benefits associated with corrosion inhibitors or other additives, throughout a half-life of the product, rather than the effects of these additives being exhausted relatively quickly after application, as is the case with a coated product.

In some embodiments, the rock salt can be considered to be heated, and thus ready for application of the liquid additive solution 36, when the rock salt 10 has a surface temperature above the boiling temperature of water (i.e., greater than or equal to about 100° C.). When the surface temperature of the rock salt is greater than or equal to 100° C., the liquid portion of the deicing solution 36 can be readily vaporized upon contact (or shortly thereafter) with the rock salt. Temperatures of less than about 100° C. may not remove a significant amount of moisture content from the liquid additive solution 36. Thus, heating the rock salt 10 crystals to a temperature less than about 100° C. may not (a) create the voids, cracks, and crevices that can be filled with additive when applying the liquid additive solution to the rock salt 10 crystal, or (b) cause vaporization of the water in the liquid additive solution when applied to the salt crystals. In some embodiments, as noted above, the salt crystals can have a surface temperature significantly above about 100° C., e.g., about 148° C. or more. This increased temperature can improve the effectiveness of the above-described treatment and moisture removal process. Further, temperatures in the above-described ranges are low enough that the water in the liquid additive solution remains on the surface of each salt crystal for enough time to help disperse and flow the carried additive materials throughout the network or cracks, crevices, and voids in the salt crystal. Finally, as noted above, application of liquid additive solution to the heated salt can result in rapid and significant cooling of the salt, so it can be desirable to heat the salt sufficiently high above the boiling temperature of water that the salt remains above the boiling temperature of water for some period of time after the application of the liquid additive solution. The temperature necessary to achieve this can vary based on the amount of water present in the liquid additive solution, the ambient temperature, the ambient atmospheric pressure, etc. In some embodiments, the temperature can be at least about 110° C. or higher.

As noted above, applying the liquid additive solution 36 to the heated salt base 10H provides a number of advantages. For example, as the liquid solution's temperature rises upon contact with the heated salt, it will become more flowable and more readily spread throughout the network of cracks, crevices, and voids in the salt crystal. Additionally, continued elevation of the temperature of the liquid additive solution upon contact with the salt will cause moisture from the additive solution 36 to evaporate and/or boil off, leaving purely additive without moisture. Still further, the heat transfer from the salt crystal to the liquid additive solution can help cool the salt crystal to a temperature suitable for packaging, as described in more detail below. Further, and as mentioned above, heating the salt in the manner described herein prior to application of a liquid additive solution can allow for spray application of a number of additives that might otherwise not be practical due to the amount of water necessary to make a sprayable solution. By way of example, calcium chloride and water can be mixed at approximately a 50:50 ratio to achieve a sprayable solution, but use of potassium chloride can require 10× the amount of water to make a sprayable solution. Use of a such a solution in prior manufacturing methods can be undesirable because of the amount of water that would be added to the salt product during the spray application. Using the methods of the present disclosure, however, the presence of additional water can be compensated for by the heated salt, which can flash vaporize the water upon or shortly after contact therewith. The methods described herein, then, can enable the use of a number of additives in liquid solutions that were not previously practical or possible.

As noted above, the liquid additive solution 36 can include any of a number of additives, including any chemical deicing agents mentioned in this disclosure, as well as other additives such as corrosion inhibitors, dyes, etc. While a single solution can include any additives as described above, in some embodiments different additives can be applied in different solutions. Accordingly, FIG. 2 represents liquid additive solution application in two steps: step 206 labeled application of deicing solution and step 208 labeled application of other additive components, such as liquid corrosion inhibitors and/or liquid dyes. In some embodiments, however, a single liquid additive solution applied in a single step can apply all additives. Additionally, or alternatively, illustrative embodiments may have a dedicated sprayer (e.g., 38A) that applies certain additive components simultaneously with application of other additive components via sprayer 36. Still further, in some embodiments certain additive components may be sprayed sequentially after others are applied in a step that follows afterwards. In one embodiment, a liquid additive solution can include, for example, a mix of 200 lbs. of 96% purity calcium chloride, 0.5 gallons of corrosion inhibitor (e.g., propylene glycol or AMP-95®, which is 2-Amino-2-methyl-1-propanol sold by the Angus Chemical Company), and 1 gallon of dye (e.g., Chromatint®, a green dyestuff/coloring agent sold by Chromatech Incorporated) per 100 gallons of water.

Step 210 of FIG. 2 denotes the formation of an additive-infused rock salt 10I (also referred to as an infused ice melt composition) after the liquid additive solution 36 is applied to the heated salt base 10H. As discussed previously, the inventors hypothesize that applying the additive solution 36 to the heated salt base 10H causes additives to be carried into the various cracks, crevices, and voids in each rock salt crystal created during the initial heating steps. Accordingly, it is hypothesized that the infusion of additives within these interior cracks, crevices, and voids allows for an extended release of such additives over time, providing increased melt performance. The infused rock salt 10I of illustrative embodiments may be contrasted with more short-living prior coated ice melt products or pure chemical ice melt compositions. Illustrative embodiments provide higher performance ice melting for significantly longer than prior coated products. Users of the infused ice melt do not have to apply the infused ice melt as frequently as prior ice melts. Additionally, the rock salt 10 works simultaneously with the deicing agent, rather than prior compositions which exhaust any additives before exposing the rock salt 10 underneath. This results in a product that provides superior performance to other coated products at a similar price. Such performance can be similar to pure chemical ice melt compositions but at a significantly lower price point because only a fraction of the more expensive chemical ice melt additive is utilized. This can reducing the environmental impact of the pure chemicals while giving superior results. Further, an additional benefit is that the methods disclosed herein encapsulate the highly hygroscopic additive chemicals, which can reduce contact with surface humidity and thereby reduce clumping and wetness to touch of the end product. This can be important because it can allow the product to have a longer shelf life exposed to air and can maintain the flow characteristics of the product that are necessary when used in, e.g., spreaders for distribution over road surfaces, etc.

The next step in the process, denoted as step 212 in FIG. 2, involves packaging and palletizing the infused ice melt 10. In some embodiments, the product can be transported into a hopper (not shown) that feeds a bagging system. Along the way, a smaller screw conveyor 40 can drop powdered potassium chloride onto the infused salt base 10. Potassium chloride can be added to help neutralize the exothermic chemical reaction of other deicing additives, such as calcium chloride. Without such a step, exothermically reacting additives like calcium chloride can create enough heat to injure or cause discomfort to animals walking directly on treated surfaces. The addition of potassium chloride can at least partially neutralize the exothermic reaction to create an animal- or pet-safe/friendly product. Moreover, the application of powdered potassium chloride is an alternative solution to the above-noted problem of incorporating potassium chloride into a sprayable liquid solution. Note that there is still some water content in the salt at this stage of the process (e.g., still being vaporized over time by the heated salt) and this water content can help adhere or bond the powdered potassium chloride to the infused salt upon application.

After the infused ice melt is packaged (e.g., drops into a bag 42), the package can be sealed from the sides and top and one or more vent perforations can be formed in the bag (e.g., by punching holes in it, etc.). As noted above, the application of the liquid additive solution (or solutions) to the heated salt base can rapidly cool the salt from the high temperatures (e.g., above boiling temperature of water) used to create voids in the crystal and flash off water from the liquid additive solution. In the time following application of the liquid additive solution, however, the infused ice melt composition can remain at an elevated temperature for some time. For example, in some embodiments the infused ice melt product can be at a temperature between about 54° C. and about 88° C. approximately 90 seconds after spraying the liquid additive solution on the heated salt. In some embodiments, the infused ice melt composition can be bagged at a temperature below about 88° C. to avoid melting bags made from certain materials, such as low density polyethylene, etc.

The infused ice melt composition can be substantially free of moisture at the time of bagging, e.g., about 99% free of moisture in some embodiments, but additional moisture will evaporate out of the composition as it continues to cool over the next several hours following bagging. Accordingly, bags 42 can include one or more pores or perforations to allow venting of water vapor/steam from the bags as the product cools. In some embodiments, a conventional moisture probe applied to the infused ice melt product at the time of bagging will indicate the product has an unacceptable moisture content. The inventors have found, however, that as long as the infused product has a temperature of at least about 54° C. at the time of bagging (e.g., as measured using an infrared or thermal imaging sensor), it will measure as sufficiently dry after approximately 24 hours of cooling.

Accordingly, the manufacturing methods described herein also contemplate methods for bagging and packaging the infused ice melt composition in a manner that can allow for continued evaporation of moisture over a period following manufacturing. For example, and as shown in FIG. 3, a conveyor system 20 can transport a filled bag 42 to a robot packing station 44. The robot 44 can pick up the bag 42 and drop it on a pallet 46 according to a predetermined layout (e.g., sevens layers of seven bags each). Once a pallet 46 is full (e.g., forty-nine bags 42), it can be automatically transferred through the rolling conveyor 20 to a wrapping system.

The wrapping system can apply a layer of stretch/shrink wrap around the pallet 46 and place a top sheet 48 of plastic material on top of the pallet 46. A second layer of stretch/shrink wrap can then be applied around the pallet 46 and edges of top sheet 48 to secure the top sheet in place with its ends disposed between the first and second layers of stretch/shrink wrap. This can provide a system for directing any water evaporated out of the ice melt composition over the subsequent hours. In particular, water vapor evaporated from the ice melt composition can escape each bag 42 via the pore or perforation formed therein can subsequently condense on the underside of the top sheet 48 (which can be expanded by the heat of the bagged product and/or manual shaping into a dome shape with a high point at the center and low points along a periphery of the pallet stack). The condensation can then flow down the top sheet (which, again, can be domed or bent such that its edges are lower than a middle portion thereof) to one of its edges. As noted above, the edges of the top sheet can be secured between the layers of stretch/shrink wrap, thereby providing a channel for the water to flow through to the ground without contacting the bags of ice melt product and re-saturating the product.

It should be apparent to one of skill in the art that illustrative embodiments provide a number of advantages. For example, illustrative embodiments provide a better performing ice melt composition that can last longer and perform more consistently than other salt-based products, and cost less than other pure chemical ice melt products with more benefits and fewer drawbacks than any individual or separate product. For example, in some embodiments the ice melt compositions described here can be more effective than prior products and provide a much longer effective or half-life of the product. In some embodiments, ice melt compositions according to the present disclosure can provide a half-life that extends between subsequent storms. Furthermore, because there is a constant supply of additives throughout the salt crystal, the product can lie dormant between storms and automatically reactive with all benefits upon contact with water in a next storm. Finally, as noted above, the use of a wider range of midsized crystals can enable better melt performance over time, with small crystals providing rapid melting and larger crystals enduring for longer times. Furthermore, illustrative embodiments of ice melt compositions remove naturally occurring moisture from the salt crystal and coat it, along with any hygroscopic chemical additives, to seal them from the environment and reduce any tendency to absorb moisture from the environment during storage, which can cause other ice melt products to clump together over time, making them less flowable/capable of being used in a spreader.

Figure 4:
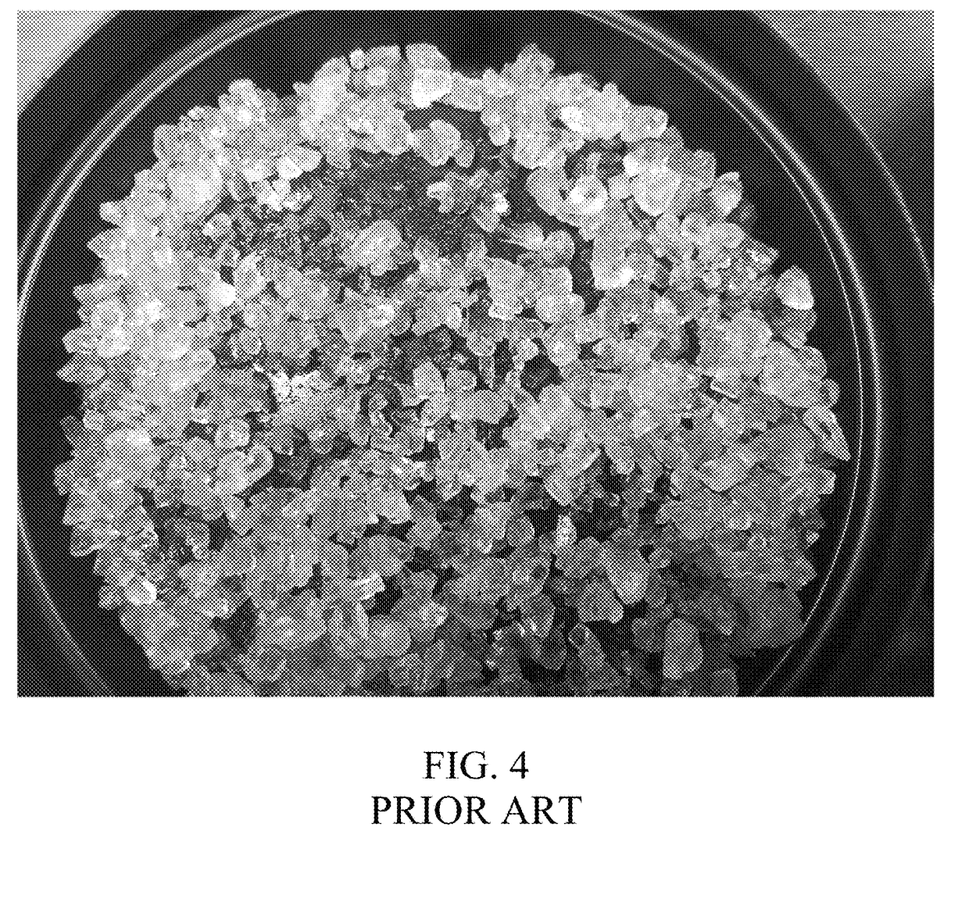
FIG. 4 is an image of a prior art ice melt composition exhibiting clumping due to absorption of water from the air.
Figure 5:
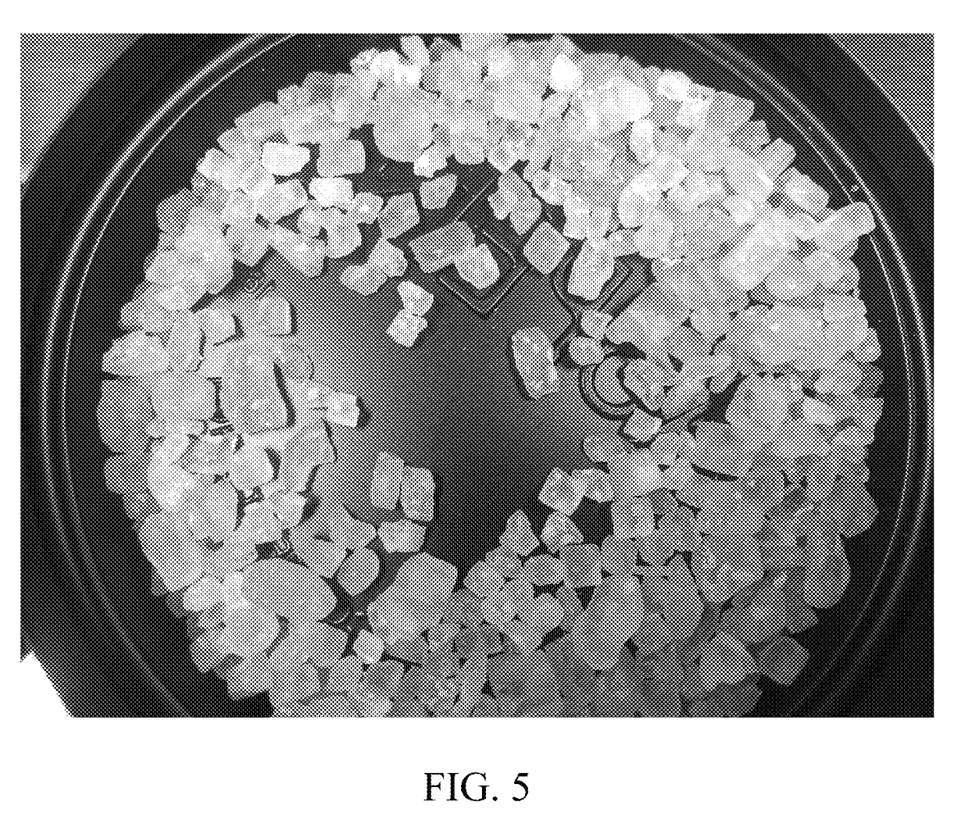
FIG. 5 is an image of one embodiment of an ice melt composition including a corrosion inhibitor and dye.
Figure 6:
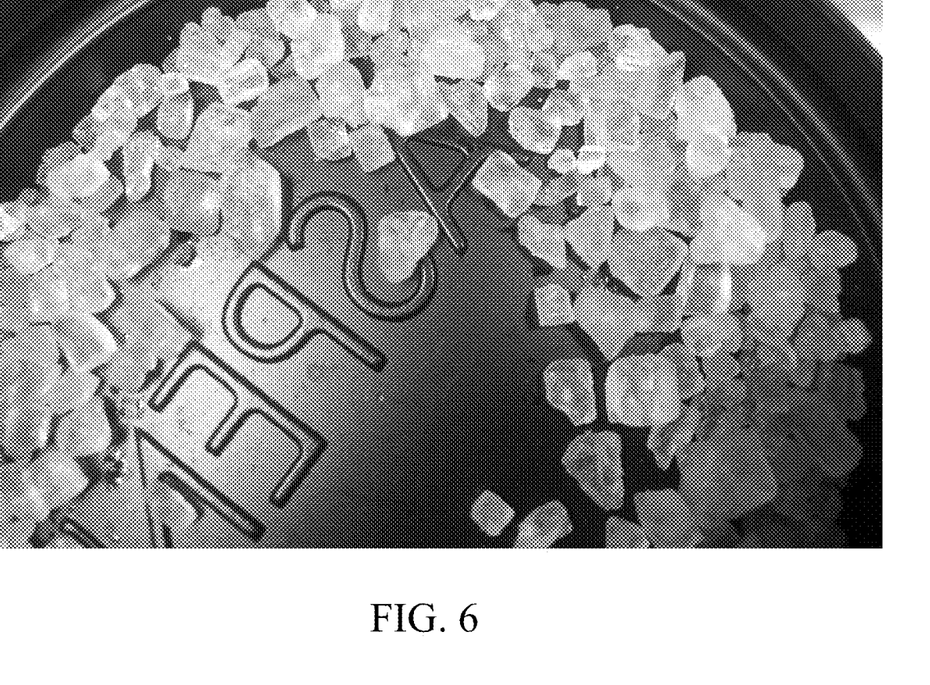
FIG. 6 is an image of one embodiment of an ice melt composition including a corrosion inhibitor, dye, and chemical deicer.

FIGS. 4-6 illustrate one example of this latter advantage of the ice melt compositions described herein. FIG. 4, for example, illustrates a prior ice melt composition after sitting exposed to the atmosphere for a period of approximately five months (though the negative effects visible in FIG. 4 were first observed after a much shorter amount of time, e.g., less than one month). FIG. 4 shows that the crystals have clumped together and, in places, appear to have partially melted. This is characteristic of "clumping," wherein atmospheric moisture is absorbed and the individual crystals adhere to one another. This destroys their ability to be fed through a spreader efficiently and, after enough time, unused product can appear to be a single mass that cannot be scooped, etc.

FIGS. 5 and 6 depict exemplary ice melt compositions according to the present disclosure. In FIG. 5, for example, a composition that includes rock salt infused with a corrosion inhibitor and a dye is shown exposed to the atmosphere after the same amount of time as FIG. 4. The clumping and melting observed in FIG. 4 are not present. Also note the greater variety of crystal sizes as compared to the prior product. This can provide advantages in melt performance, as described above. FIG. 6 depicts another embodiment of an ice melt composition including an infused corrosion inhibitor, dye, calcium chloride, and potassium chloride (i.e., chemical deicers). This image depicts the product having been exposed to the atmosphere for the same length of time as in FIGS. 4 and 5 (i.e., these images come from a "side-by-side" test in which samples of each product were left exposed to the same atmospheric conditions for the same period of time).

In addition to the above-described ice melt compositions, the methods described herein can find utility in use with other types of natural salt bases, as well. For example, infused salt products can be formulated using the techniques described herein and an edible salt base in some embodiments. By way of further example, in one embodiment an edible salt base can be heated as described herein and then a liquid additive solution can be applied that includes any of a variety of edible additives, such as various juices, flavoring agents, foods-safe coloring agents, etc. Accordingly, the present disclosure is not limited to the creation of ice melt compositions and the methods described herein can be utilized to infuse a salt base with any desired additive via the application of a liquid additive solution to the heated salt base.

The embodiments of the invention described above are intended to be merely exemplary; numerous variations and modifications will be apparent to those skilled in the art. Such variations and modifications are intended to be within the scope of the present invention as defined by any of the appended claims. All publications and references cited herein are expressly incorporated herein by reference in their entirety.

What is claimed is:

1. A method of infusing natural rock salt, comprising:
   heating natural rock salt to a temperature above the boiling point of water to define a heated rock salt, wherein the temperature above the boiling point of water is at least about 110° C. and is below about 250° C.;
   applying a liquid additive solution to the heated rock salt to create an infused rock salt;
   wherein the temperature of the heated rock salt is sufficiently high that the rock salt remains above the boiling point of water after the liquid additive solution is applied thereto,
   wherein the rock salt is heated to the temperature above the boiling point of water within about 2 minutes, the heated rock salt remaining above the boiling point of water for less than about 1 minute after the liquid additive solution is applied thereto,
   wherein the rock salt comprises a plurality of individual rock salt crystals having a diameter between about 3 mm and about 7 mm.

2. The method of claim 1, wherein the liquid additive solution includes any of dyes, corrosion inhibitors, and chemical deicers.

3. The method of claim 1, wherein the liquid additive solution includes edible additives.

4. The method of claim 1, wherein the temperature above the boiling point of water is at least about 148° C.

5. The method of claim 1, further comprising bagging the infused rock salt while it is at a temperature between about 54° C. and about 88° C.

6. The method of claim 1, wherein the liquid additive solution is applied immediately after the rock salt is heated to the temperature above the boiling point of water.

7. The method of claim 1, wherein the liquid additive solution comprises a corrosion inhibitor.

8. The method of claim 1, wherein the liquid additive solution comprises a dye.

9. The method of claim 1, wherein heating the rock salt to the temperature above the boiling point of water vaporizes water in the rock salt.

10. The method of claim 1, wherein the liquid additive solution comprises at least one of calcium chloride, magnesium chloride, potassium chloride, calcium magnesium acetate, potassium acetate, potassium formate, sodium formate, calcium formate, urea, methanol, ethylene glycol, propylene glycol, or glycerol.

11. The method of claim 1, further comprising applying a second dry additive to an outer surface of the infused rock salt.

12. The method of claim 1, wherein the rock salt is heated to bring down the moisture content therein to less than 1%.

13. The method of claim 11, wherein the second dry additive is selected from the group consisting of: chemical deicers, dyes, and corrosion inhibitors.

14. The method of claim 1, wherein the natural rock salt is not pelletized.

* * * * *